(12) United States Patent
Newcomb et al.

(10) Patent No.: US 10,280,974 B2
(45) Date of Patent: May 7, 2019

(54) STRUCTURES AND METHODS FOR CONTROLLED THERMAL EXPANSION

(71) Applicant: GM GLOBAL TECHNOLOGY OPERATIONS LLC, Detroit, MI (US)

(72) Inventors: Bradley A. Newcomb, Troy, MI (US); Jevon Kennell, Howell, MI (US); David S. Schulz, Livonia, MI (US); Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/661,242

(22) Filed: Jul. 27, 2017

(65) Prior Publication Data

US 2019/0032709 A1    Jan. 31, 2019

(51) Int. Cl.
| *F16C 19/18* | (2006.01) |
| *F16C 19/52* | (2006.01) |
| *F16C 35/04* | (2006.01) |
| *F16H 48/42* | (2012.01) |
| *F16C 35/063* | (2006.01) |
| *B29C 70/68* | (2006.01) |
| *B29L 31/04* | (2006.01) |

(52) U.S. Cl.
CPC ............ *F16C 19/525* (2013.01); *F16C 19/18* (2013.01); *F16C 35/042* (2013.01); *F16H 48/42* (2013.01); *B29C 70/68* (2013.01); *B29L 2031/04* (2013.01); *F16C 35/063* (2013.01); *F16C 2202/06* (2013.01); *F16C 2202/22* (2013.01); *F16C 2208/82* (2013.01); *F16C 2326/06* (2013.01); *F16H 2048/423* (2013.01)

(58) Field of Classification Search
CPC ...... F16C 19/18; F16C 19/525; F16C 27/066; F16C 35/042; F16C 35/063; F16C 33/64; F16C 33/66; F16C 33/586; F16C 2202/06; F16C 2202/22; F16C 2226/76; F16C 2226/80; F16C 2240/30; F16C 2208/82; F16C 2326/06; F16F 1/376; F16F 15/3156; F16F 2224/0241; F16H 48/42; F16H 2048/423; B29C 70/68; B29C 2031/04
USPC ....... 384/456, 557, 535–536, 565, 569, 582, 384/581
See application file for complete search history.

(56) References Cited

U.S. PATENT DOCUMENTS

| 1,652,468 | A | * | 12/1927 | Catlin | F16C 33/06 |
| | | | | | 29/898.059 |
| 1,660,512 | A | * | 2/1928 | Jaenicke | B65G 13/075 |
| | | | | | 193/35 A |
| 2,534,142 | A | * | 12/1950 | Morton | F16C 27/04 |
| | | | | | 384/535 |

(Continued)

*Primary Examiner* — Marcus Charles
(74) *Attorney, Agent, or Firm* — Lorenz & Kopf, LLP

(57) ABSTRACT

Products and methods are provided for controlling thermal expansion. In various exemplary embodiments, a structure includes a body constructed of a material exhibiting a first coefficient of linear thermal expansion. A component is disposed inside the body and exhibits a second coefficient of linear thermal expansion that is lower than the first coefficient of linear thermal expansion. A layer is wrapped around the body and constrains thermal expansion of the body. The layer includes a composite containing fibers that are aligned with one another to constrain expansion in a desired direction or in multiple directions. The layer is independently useful to provide a retention function for the body.

20 Claims, 7 Drawing Sheets

(56) References Cited

U.S. PATENT DOCUMENTS

| | | | | |
|---|---|---|---|---|
| 2,926,051 A * | 2/1960 | Cazier | ............... | F16C 27/04 384/535 |
| 3,301,612 A * | 1/1967 | Thomas | ............... | F16C 27/066 384/536 |
| 4,116,502 A * | 9/1978 | Horler | ............... | F16C 21/00 384/126 |
| 4,339,158 A * | 7/1982 | Greener | ............... | B65G 39/09 193/37 |
| 4,772,139 A * | 9/1988 | Bretton | ............... | F16C 27/04 384/535 |
| 4,793,459 A * | 12/1988 | Forknall | ............... | B65G 39/09 193/37 |
| 5,048,980 A * | 9/1991 | Dickinson | ............... | F16C 27/066 384/536 |
| 5,110,382 A * | 5/1992 | Terry | ............... | B02B 3/04 156/215 |
| 5,454,460 A * | 10/1995 | Lane | ............... | B65G 39/02 193/35 R |
| 6,630,761 B1 * | 10/2003 | Gabrys | ............... | F16C 27/04 310/90 |
| 6,715,925 B2 * | 4/2004 | Pairone | ............... | D06F 37/00 384/255 |
| 7,488,111 B2 * | 2/2009 | Chen | ............... | F16C 27/066 384/535 |
| 7,744,284 B2 * | 6/2010 | Tada | ............... | F16C 13/006 384/537 |
| 7,896,554 B2 * | 3/2011 | Yamada | ............... | F16C 19/06 180/381 |
| 8,376,617 B2 * | 2/2013 | Schroeder | ............... | F16C 33/08 384/97 |
| 8,602,197 B2 * | 12/2013 | Horling | ............... | B65G 39/06 193/37 |
| 8,851,759 B2 * | 10/2014 | Bussit | ............... | F16C 19/06 384/536 |
| 9,086,095 B2 * | 7/2015 | Vissers | ............... | F16C 33/60 |
| 9,360,082 B2 * | 6/2016 | Hilton | ............... | F16C 27/066 |
| 2003/0099417 A1 * | 5/2003 | Bauer | ............... | F16C 27/04 384/535 |
| 2008/0253710 A1 * | 10/2008 | Dodoro | ............... | F16C 27/066 384/548 |
| 2011/0133413 A1 * | 6/2011 | Kato | ............... | F16C 33/76 277/565 |

* cited by examiner

STRUCTURES AND METHODS FOR CONTROLLED THERMAL EXPANSION

INTRODUCTION

The present disclosure generally relates to structures and methods for controlled thermal expansion and more particularly, relates to controlling thermal expansion with a layer that includes selectively oriented fibers.

Assembled structures may include components made of various different shapes and materials. The individual components may respond differently to heating, and in assemblies such as those where different rates of expansion are undesirable, accounting for those different rates is needed. One way to address the differential thermal expansion is to account for the differences in the assembly's design tolerances, which are implemented when fabricating the individual components. This approach may be of limited effectiveness such as when the expansion rate results in the creation of gaps between components.

Accordingly, it is desirable to provide structures and methods that effectively address heat expansion for a broad range of applications. Furthermore, other desirable features and characteristics of structures and methods for controlling thermal expansion will become apparent from the subsequent detailed description and the appended claims, taken in conjunction with the accompanying drawings and the foregoing technical field and background.

SUMMARY

Products and methods are provided for controlling thermal expansion. In various exemplary embodiments, a structure includes a body constructed of a material exhibiting a first coefficient of linear thermal expansion. A component is disposed inside the body and exhibits a second coefficient of linear thermal expansion that is lower than the first coefficient of linear thermal expansion. A layer is wrapped around the body and constrains thermal expansion of the body. The layer includes a composite that contains fibers aligned with one another.

In additional embodiments, the body is cylindrical and has a circumference. The fibers are aligned in the circumferential direction.

In additional embodiments, the body is formed of an aluminum alloy and the component is formed of steel. The layer constrains thermal expansion of the body toward the second coefficient of linear thermal expansion, approaching that of the steel component.

In additional embodiments, a number of grooves are formed in the body and the layer is formed on the body including in the grooves.

In additional embodiments, the grooves are dovetail shaped and extend from the outer circumference of the body into the body. Each groove has a width at the outer circumference and a greater width at the bottom of the groove.

In additional embodiments, the component is a bearing, wherein the layer is formed in a band disposed radially outside and around the bearing.

In additional embodiments, the body is cylindrical and a series of keys and keyways are formed in the body alternating around the circumference.

In additional embodiments, a first set of fibers is oriented in alignment with one another at one angle relative to the body. A second set of fibers is oriented in alignment with one another at another angle relative to the body. The angles are variable relative to one another.

In additional embodiments, the body is formed in a hollow cylindrical shape and a shaft extends through the body. The shaft is rotationally supported on the body by the component.

In additional embodiments, the component is a pair of bearings spaced apart along the body.

In additional embodiments, the fibers are made of a material that exhibits a stiffness greater than 70 gigapascal and a thermal expansion less than 10 ppm/K.

In additional embodiments, the fibers are made of carbon and the composite includes a polymer in which the fibers are disposed.

In other exemplary embodiments, a method is provided for controlling thermal expansion. A body is formed of a material exhibiting one coefficient of linear thermal expansion. A layer of a fibrous material surrounds the body, wherein the fibrous material includes fibers oriented in alignment with one another. A polymer is included in the layer with the fibers disposed in the polymer as a composite. A component is positioned inside the body, wherein the component is made of a material exhibiting another coefficient of linear thermal expansion that is lower than the coefficient of linear thermal expansion of the body. The layer constrains thermal expansion of the body.

In additional embodiments, the body is formed in a cylindrical shape. The fibers are aligned relative to the body in the circumferential direction.

In additional embodiments, the body is formed of an aluminum alloy, and the component is formed of steel. The layer constrains thermal expansion of the body to reduce the rate of thermal expansion of the body.

In additional embodiments, a number of grooves are formed in the body. The layer is formed on the body including in the grooves.

In additional embodiments, the component is a bearing and the layer is formed in a band disposed radially outside and around the bearing.

In additional embodiments, a series of keys and keyways are formed on the body alternating around its circumference.

In additional exemplary embodiments, a method is provided for retention. A body is formed to be assembled in an opening defined by a surface. A layer of a fibrous material is added to an interface between the body and the surface. A polymer is included in the layer with the fibers disposed in the polymer as a composite. The body is positioned in the opening. The layer is cured or solidified while the body is inside the opening and the body is retained in the opening by the layer.

In additional embodiments, a series of keys and keyways are formed in the body and the surface, alternating at the interface to align the body with the surface.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the subject matter of the application or its uses. Furthermore, there is no intention to be bound by any expressed or implied theory presented in the preceding introduction, summary or the following detailed description.

In accordance with preferred embodiments described herein, coefficient of linear thermal expansion is controlled by including a composite layer or overwrap on a structural body. The composite layer may be tailored to the body to provide a coefficient of linear thermal expansion that more closely matches that of a mating component. Accordingly, the body and the component though different, have the same or similar expansion characteristics. In various embodiments, the composite is a fibrous composite with the fibers oriented in a selected direction or directions for which expansion control is desired. In various embodiments, the composite, when disposed between mating parts of an assembly may be used to retain the parts together.

Accordingly, the following description relates to structures and methods for controlling thermal expansion and retention. The structures and methods may be described in the context of a vehicle drive system application, for purposes of demonstrating an example. In a vehicle drive system components such as those in a differential, present interfaces between fixed and moving components, such as a shaft rotating relative to a housing, where thermal expansion may occur. The present disclosure is not limited to vehicle drive system applications, but rather, also encompasses any application where thermal expansion control is desired. Accordingly, the teachings of the present disclosure can be applied to a drive system or to other applications, as desired.

Figure 1:
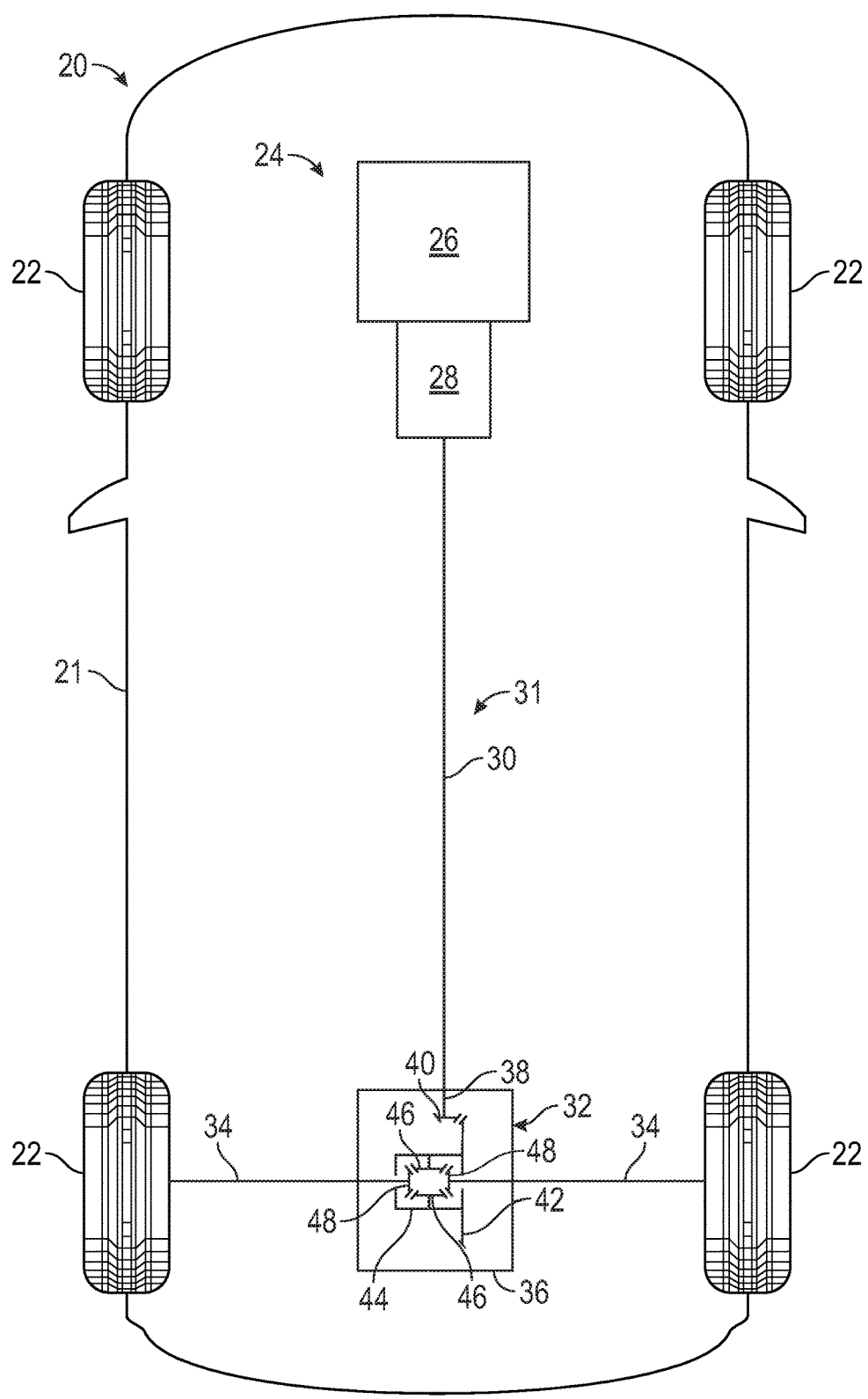
FIG. 1 is a schematic illustration of a vehicle depicting an application of structures and methods for controlled thermal expansion, in accordance with an embodiment.

In an example as illustrated in FIG. 1, a vehicle drive system application involves a vehicle 20, with a body 21 supported on four wheels 22. The vehicle 20 includes a propulsion system 24, which may include any form of engine 26. The engine 26 may provide output through a variable transmission 28. The propulsion system 24 may be used to drive any or all of the wheels 22 through a drive system 31. In the current example, the propulsion system 24 drives two wheels 22 through a drive shaft 30, a differential 32 and axles shafts 34. The differential 32 receives rotational torque through the drive shaft 30 and distributes it to the axle shafts 34. The differential 32 includes a housing 36, which does not rotate. The drive shaft 30 enters the housing 36, such as through a connected pinion shaft 38. The pinion shaft 38 rotates with the drive shaft 30 and includes a pinion gear 40. The pinion gear 40 meshes with a ring gear 42, such as through a beveled arrangement, to transfer rotation of the drive shaft 30 to the axles 34. The ring gear 42 is rotationally supported in the housing 36 and is coupled with a cage 44. A pair of spider gears 46 are rotationally supported on the cage 44 and engage a pair of side gears 48, each of which is connected with an axle shaft 34. The drive system 31 presents a number of interfaces where a rotating element engages a non-rotating element. For purposes of description, the example of the pinion shaft 38 and housing 36 is further described below.

Figure 2:
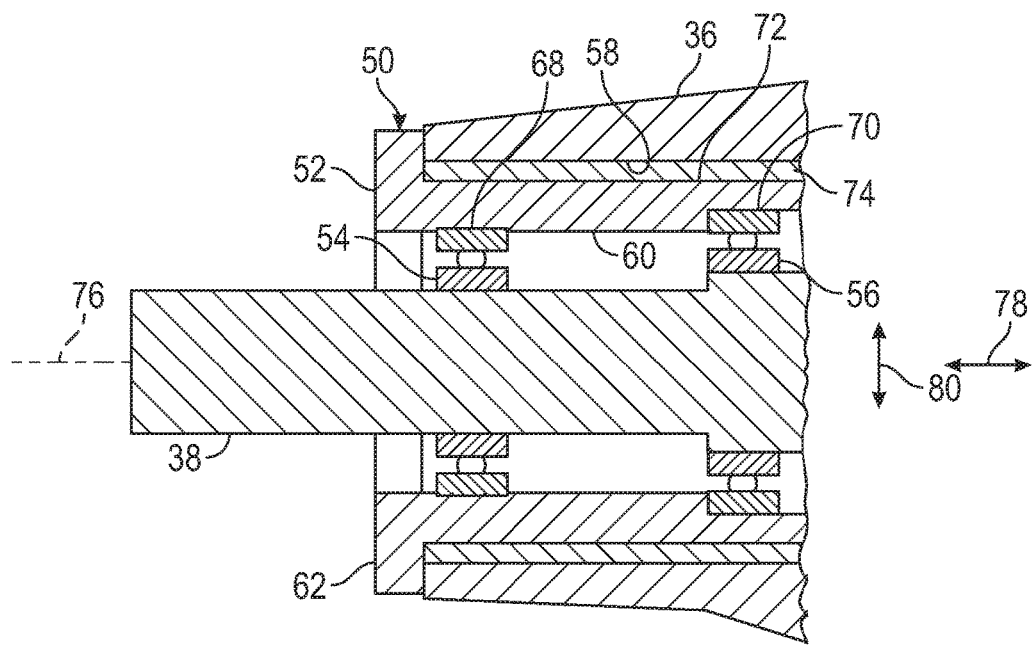
FIG. 2 is a schematic cross sectional illustration of part of the drive system of the vehicle of FIG. 1 employing a structure for controlled thermal expansion, in accordance with an embodiment.

The example of the pinion shaft 38 and housing 36 of the differential 32 is further illustrated in FIG. 2. The pinion shaft 38 rotates relative to the non-rotating housing 36 and is supported thereon by a bearing cartridge assembly 50. The bearing cartridge assembly 50 includes a cartridge 52 and internal components in the form of bearings 54, 56. The bearing cartridge assembly 50 is received in an opening 58 defined by the housing 36 and the pinion shaft 38 extends through the bearing cartridge assembly 50. The pinion shaft 38 is rotationally supported by the bearings 54, 56. A solid connection is desired between the bearings 54, 56 and the housing 36, which in this example is provided through the cartridge 52. Maintaining a solid connection avoids play in the pinion shaft 38, avoids noise and vibration, and avoids inefficiencies, such as in the bearings 54, 56.

In various examples the cartridge 52 includes a body 60 generally formed in the shape of a hollow cylinder through which the pinion shaft 38 extends. The cartridge 52 includes a flange 62 joined or formed with the body 60 that is disposed outside the housing 36 and mates therewith around the opening 58. In the current example the cartridge 52 and the bearings 54, 56 are made of different materials. Specifically, the cartridge 52 is made of an aluminum alloy and the bearings 54, 56 are made of steel. It should be understood that these materials are examples and in other embodiments, different materials may be encountered. In the current example, the cartridge 52 and the bearings 54, 56 expand at different rates when heated, such as during operation of the vehicle 20. In the case of the steel bearings 54, 56, the coefficient of linear thermal expansion (CLTE) in microns per unit of length per degree Kelvin expressed using parts-per-million, is approximately 12 ppm/K. On the other hand, the CLTE of the aluminum cartridge 52 is approximately 24 ppm/K. Accordingly, the cartridge 52 expands at a rate that is approximately double that of the bearings 54, 56. The greater rate of expansion of the cartridge 52 means there is an inherent tendency to create gaps at the interfaces 68, 70 between the bearings 54, 56 and the cartridge 52 when temperatures rise. As noted above, any gaps at the interfaces 68, 70 contribute to inefficiencies and are undesirable. In structures such as those with the bearings 54, 56, inefficiencies created in the bearings may contribute to additional heat increases, which itself may further increase the effects of thermal expansion. In the current embodiment, the CLTE of the cartridge 52 is altered by surrounding the body 60 at its outer perimeter 72 with a layer 74.

In the exemplary embodiment, the pinion shaft 38 rotates about an axis 76, and an axial direction 78 is defined parallel to the axis 76. A radial direction 80 is defined perpendicular to the axial direction 78. The layer 74 is tailorable to alter the rate of expansion in the axial direction 78, in the radial direction 80, or in a combination of both directions 78, 80. The layer 74 is made of a fiber composite from a fibrous material and a matrix material. The fibrous material is one with high stiffness and low thermal expansion. For example, the stiffness (modulus of elasticity) of the fibrous material, is greater than 70 gigapascal and the thermal expansion is less than 10 ppm/K. In various examples the fibrous material has fibers of carbon, glass, para-aramid, meta-aramid, basalt, Polyethylene, combinations thereof, or another material. In various examples the matrix material may be polymer such as a thermoset or thermoplastic. Example polymers include, but are not limited to: Acrylonitrile butadiene styrene (ABS), Polymethyl Methacrylate (PMMA), Celluloid, Cellulose acetate, Cycloolefin Copolymer (COC), Benzoxazine, Bis-Maleimides (BMI), Cyanate esters, Epoxy, Ethylene-Vinyl Acetate (EVA), Ethylene vinyl alcohol (EVOH), Fluoroplastics (including PTFE, FEP, PFA, CTFE, ECTFE, ETFE), Phenioc (PF), Polyacetal (POM or Acetal), Polyacrylates (Acrylic), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene terephthalate (PBT), Polycaprolactone (PCL), Polychlorotrifluoroethylene (PCTFE), Polyethylene terephthalate (PET), Polycyclohexylene dimethylene terephthalate (PCT), Polycarbonate (PC), Polyhydroxyalkanoates (PHAs), Polyketone (PK), Polyester, Polyetheretherketone (PEEK), Polyetherketoneketone (PEKK), Polyetherimide (PEI), Polyethersulfone (PES), Polysulfone, Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polystyrene (PS), Polysulfone (PSU), Polytrimethylene terephthalate (PTT), Polyurethane (PU), Polyvinyl acetate (PVA), Polyvinyl chloride (PVC), Polyvinylidene chloride (PVDC), Styrene-acrylonitrile (SAN), polycarbonate+acrylonitrile butadiene styrene mix (ABS+PC), Polypropylene (PP), Polyethylene (PE), unsaturated Polyester, Polyeurethane (PUR), Vinyl ester, Silcone, or combinations or blends in any amount thereof, or may be another type.

Figure 3:
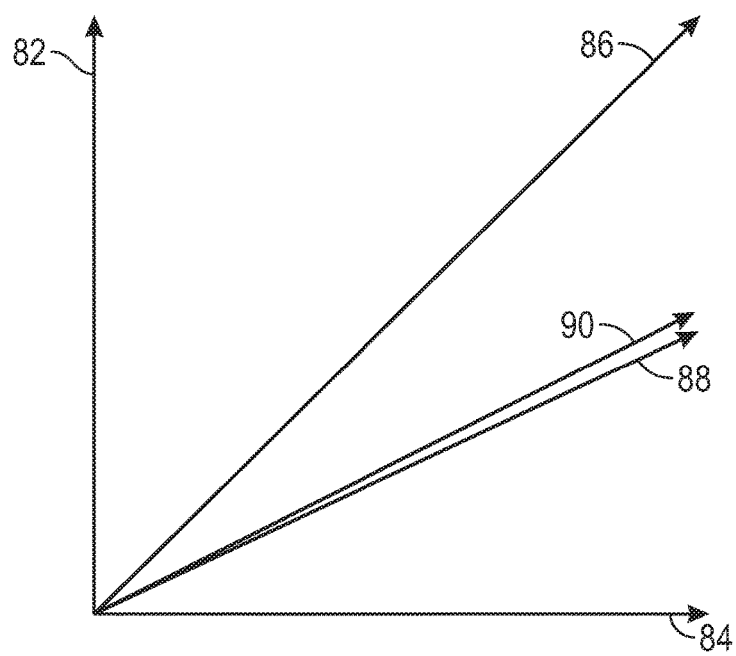
FIG. 3 is a plot of specimen dimension as a function of temperature for various structures including the cartridge body and the component of the embodiment of FIG. 2.
Figure 4:
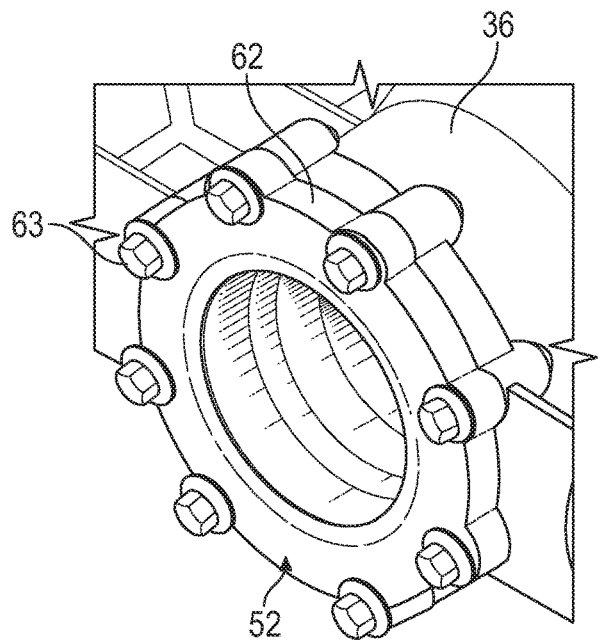
FIG. 4 is a perspective illustration of part of the drive system of FIG. 2, in accordance with an embodiment.
Figure 5:
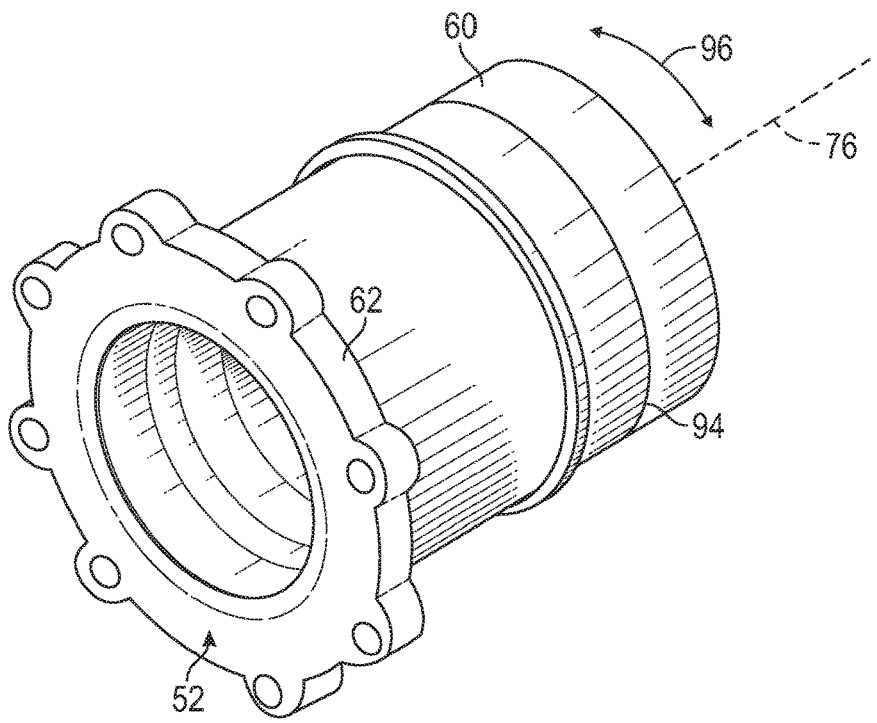
FIG. 5 is a perspective illustration of the cartridge of the drive system of FIG. 2, in accordance with an embodiment.
Figure 6:
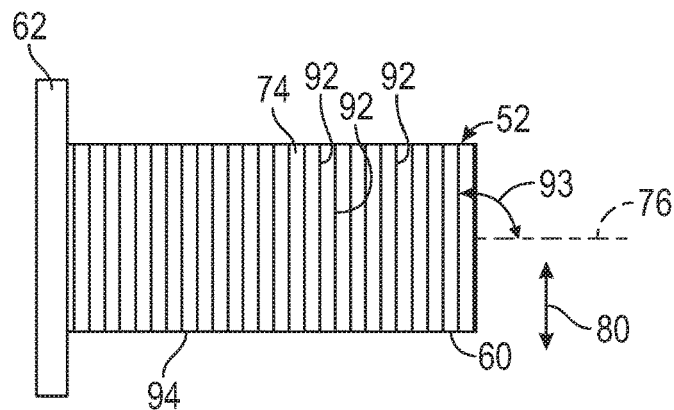
FIG. 6 is a schematic illustration of the cartridge of FIG. 5 with a composite overlay added, in accordance with an embodiment.

With reference to FIG. 3, a graph depicts heat expansion rates with distance of expansion represented on the vertical axis 82 and temperature represented on the horizontal axis 84. In the current example, curve 86 represents the dimensional change of the body 60 and the curve 88 represents the dimensional change of the bearings 54, 56 as a function of temperature. In addition to FIG. 2, the cartridge 52 is shown in perspective view in FIG. 4 assembled to the housing 36 and retained thereto by bolts 63, and in FIG. 5 in perspective view removed from the housing 36. As illustrated, the body 60 expands at a rate that is considerably higher than that of the bearings 54, 56. Through inclusion of the layer 74 surrounding the body 60, thermal expansion of the body 60 is constrained, and is altered so that the thermal expansion rate of the body 60 is tailored to approximate that of the bearings 54, 56 as shown by curve 90. In this example, radial expansion of the body 60 is constrained to curve 90 by aligning the fibers 92 in the layer 74 as represented in FIG. 6. It should be understood that the fibers 92 are represented by simple lines for description purposes. To constrain radial expansion of the body 60, the fibers 92 are aligned at an angle 93 of ninety-degrees relative to the axis 76 and extend around at least part of the circumference 94 (also shown in FIG. 5), of the body 60. Accordingly, circumferential wrapping of the fibers 92 constrains expansion of the body 60 in the radial direction 80. With additional reference to FIG. 5, the fibers 92 are oriented in a circumferential direction 96, which is aligned with the circumference 94 of the body 60. By aligning the fibers 92 so that they extend in the circumferential direction 96, their high stiffness and low thermal expansion characteristics resist expansion of the body 60 in the radial direction 80. As temperatures increase at the differential 32, the body 60 with its property to expand at approximately 24 ppm/K is constrained by the layer 74 and its fibers 92. A compressive stress develops in the body 60 which restricts the body 60 from expanding at the rate of curve 86. The amount of fibers 92 included in the layer 74 is selected so that the developed stress limits the rate of expansion of the body 60 to the curve 90. Constraining the radial expansion of the body 60 to the curve 90 maintains full design contact between the body 60 and the bearings 54, 56. As a result, gaps at the interfaces 68, 70 do not develop, the efficiency of the bearings 54, 56 is maintained, and increased noise and vibration are avoided.

Figure 7:
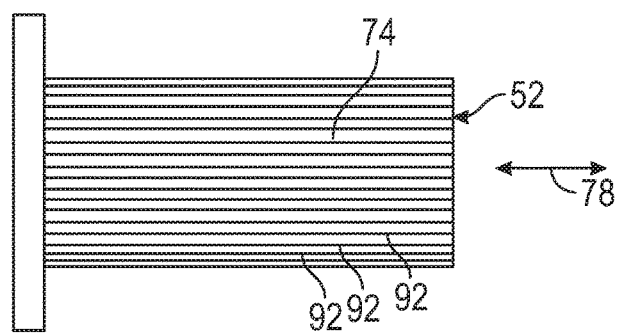
FIG. 7 is a schematic illustration of the cartridge of FIG. 5 with a composite overlay added, in accordance with an embodiment.
Figure 8:
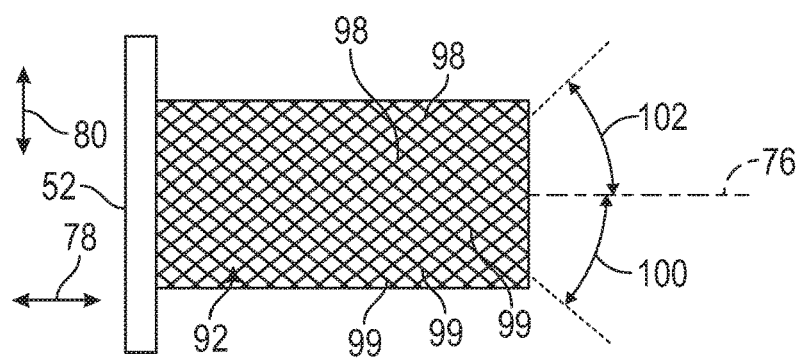
FIG. 8 is a schematic illustration of the cartridge of FIG. 5 with a composite overlay added, in accordance with an embodiment.

In a number of embodiments as illustrated in FIG. 7, the fibers 92 are oriented in the layer 74 in the axial direction 78. This orientation is effective in constraining the expansion of the cartridge 52 in length along the axial direction 78. In this example, the fibers are aligned at zero degrees relative to the axial direction 78 for maximum constraint in the axial direction 78. Where expansion is desired in both the axial direction 78 and in the radial direction 80, the fibers 92 as shown in FIGS. 6 and 7 may be used together on the body 60. In this regard, as shown in FIG. 8 one set 98 of the fibers 92 is aligned in a pattern oriented at an angle 100 relative to the axis 76. The angle 100 is variable between zero and ninety degrees. Another set 99 of fibers 92 is aligned in a pattern oriented at an angle 102 relative to the axis 76. When the angles 100, 102 are set at ninety degrees relative to the axis 76, such as shown in FIG. 6, a maximum effect on reducing thermal expansion in the radial direction 80 is achieved. When the angles 100, 102 are set at zero degrees relative to the axis 76, such as shown in FIG. 7, a maximum effect on reducing thermal expansion in the axial direction 78 is achieved. Setting the angles 100, 102 between zero and ninety degrees relative to the axis 76 results in a reduction in expansion in both the axial direction 78 and in the radial direction 80. Setting the angles 100, 102 at various angles between zero and ninety degrees varies the amount to which thermal expansion of the body is constrained. The amount of expansion reduction achieved is tailorable to match the expansion rate of an adjoining component in a single direction or in multiple directions.

Figure 9:
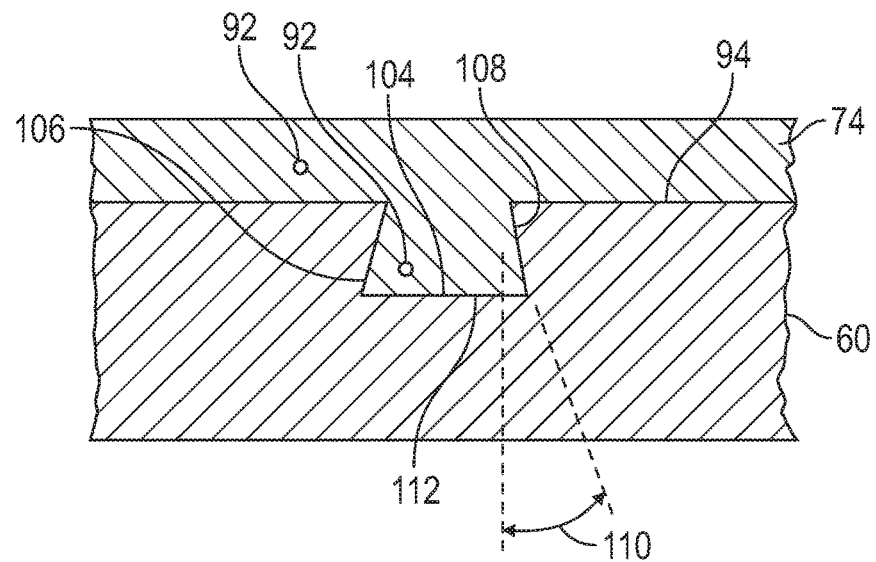
FIG. 9 is a detail cross sectional illustration of part of the cartridge of FIG. 2, in accordance with an embodiment.

In a number of embodiments as illustrated in the detail view of FIG. 9, the body 60 includes grooves 104 in its outer circumference 94. The layer 74 is formed around the outer circumference 94 including within the grooves 104. The inclusion of the grooves 104, oriented to extend in the same direction as the fibers 92, assists in restraining the overwrapped body 60. The effect is increased by using dovetail shaped grooves 104 with walls 106, 108 sloping at an angle 110, so that the slots 104 are wider at their bottom 112 than at the outer circumference 94 of the body 60. Inclusion of the grooves 104 mechanically locks the layer 74 to the body 60 and provides another mechanism through which to tailor the amount of expansion constraint provided by the layer 74. Angles 110 of between five and forty-five degrees have been found advantageous in increasing the amount of expansion constraint achieved through the layer 47.

Figure 10:
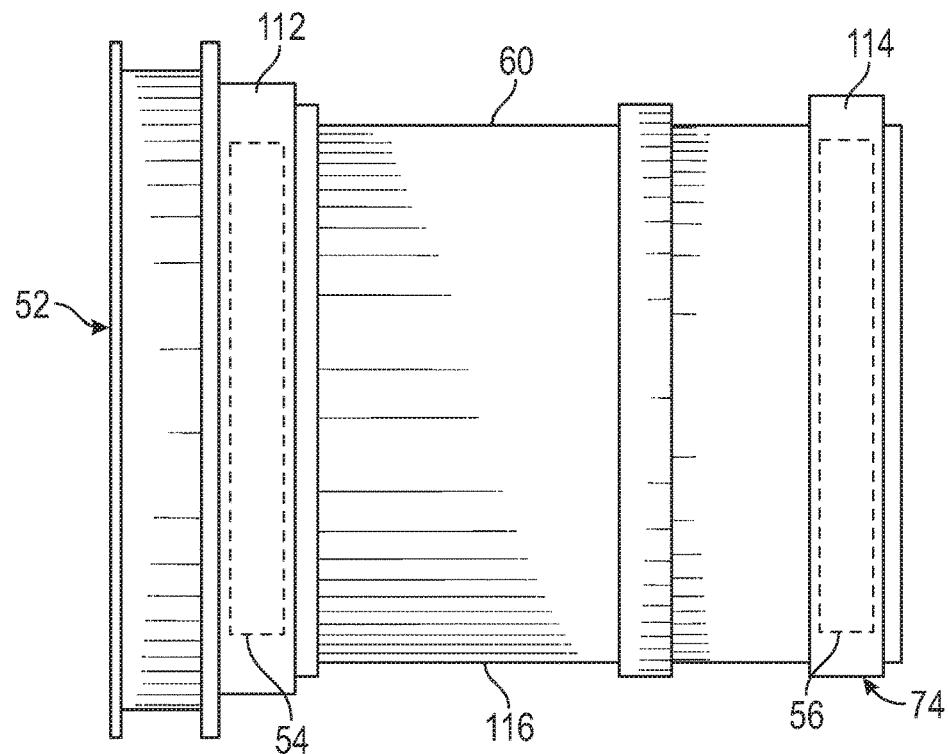
FIG. 10 is an illustration of the cartridge of FIG. 5 with a composite overlay added, in accordance with an embodiment.
Figure 11:
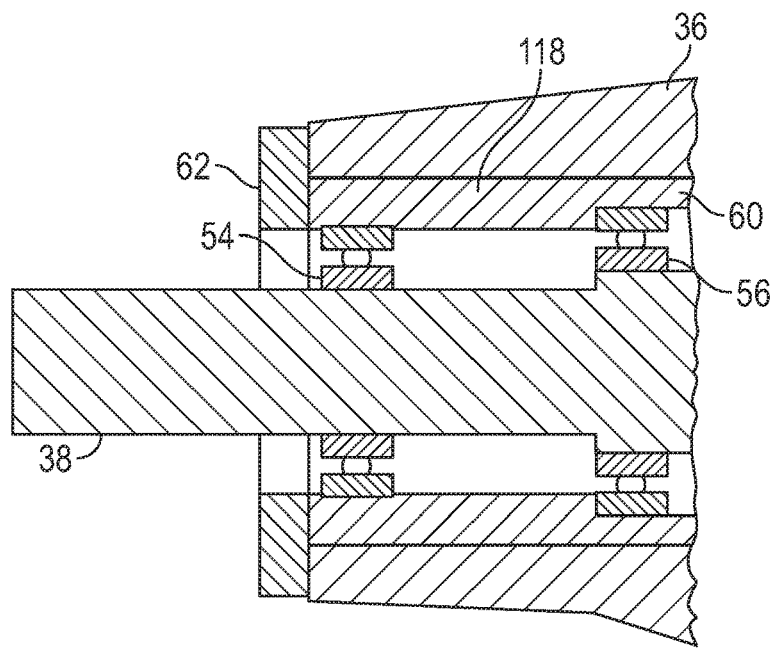
FIG. 11 is a schematic cross sectional illustration of part of the drive system of FIG. 1 employing a structure for controlled thermal expansion, in accordance with an embodiment.

In a number of embodiments as illustrated in FIG. 10, the cartridge 52 is surrounded or overwrapped with the layer 74 in select bands 112 and 114 on the body 60. In this example, the cartridge 52 and the body 60 may be the same, or the cartridge 52 may include multiple components. The locations of the bands 112 and 114 correspond to the internal location of the bearings 54 and 56, respectively. Forming the layer 74 in the bands 112 and 114 around the location of the bearings 54, 56 only, with a gap 116 between the bands 112, 114, is effective in applications where radial expansion along the length of the body 60 between the bearings 54, 56 is acceptable, but radial constraint at the location of the bearings 54, 56 is desired. In other words, for the cartridge 52, constraint of radial expansion is useful at the location of the bearings 54, 56 to maintain full contact between the bearings 54, 56 and the body 60. In other applications, constraint along the entire body 60 may be preferred, such as results from the arrangement shown in FIG. 2. With reference to FIG. 11, constraint along the entire body 60 may also be achieved by forming the body 60 from a fiber composite structure 118. The flange 62, which remains metal, or may be formed of a composite material such as the same material ads the body 60, is joined with the fiber composite structure 118. The fiber composite structure 118 may be formed around the bearings 54, 56, or the bearings may be inserted after formation of the body 60. Axial and radial thermal expansion of the fiber composite structure 118 is tailored by the angle or angles at which the fibers 92 are oriented in the fiber-composite material.

Figure 12:
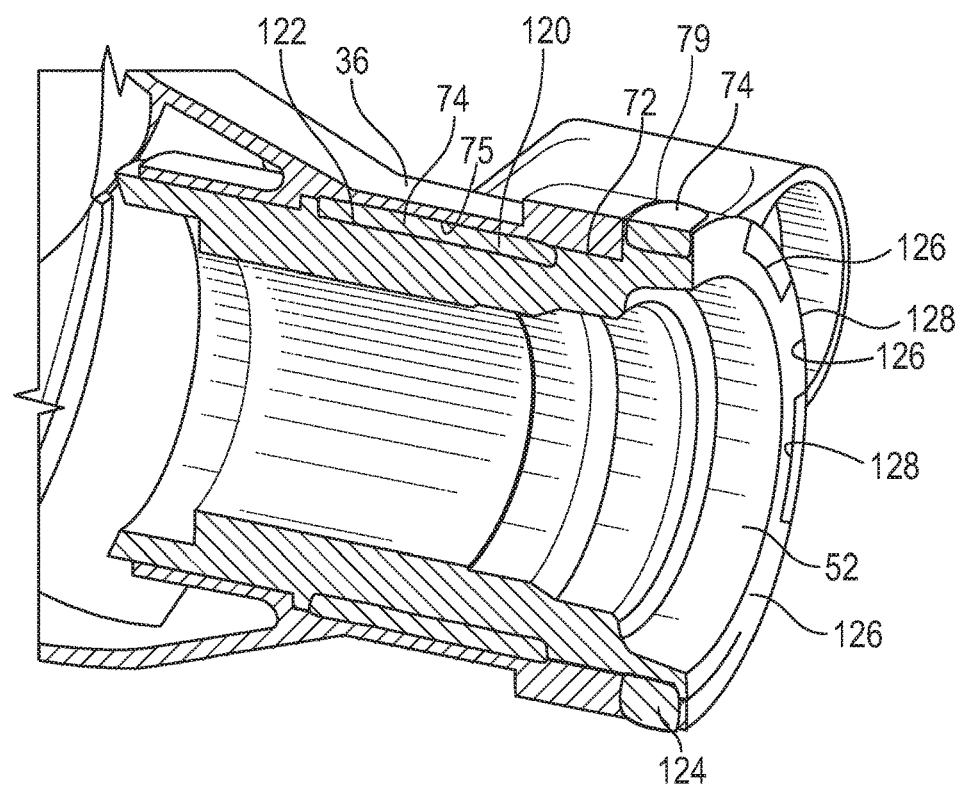
FIG. 12 is a perspective sectional illustration of a cartridge with a composite layer added, in accordance with an embodiment.

In a number of embodiments as illustrated in FIG. 12, the layer 74 has also been found useful to retain the cartridge 52 in the housing 36. In this example, a band 120 of the layer 74 is overwrapped around the center area 122, and another band 124 is overwrapped adjacent the outer end 126 of the cartridge 52. Accordingly, in this example the layer 74 refers to both the band 120 and the band 124. The layer 74 may be used for either or both of its thermal expansion restriction function and its retention function. In this example, the housing 36 and the cartridge 52 include alternating keyways 126 and keys 128 extending in the axial direction 78 through which the cartridge 52 is aligned with the housing 36 and rotationally constrained therein by the spline-like feature. In other embodiments, other spline arrangements may be used. The band 120 provides the thermal expansion function and the band 124 is responsible for retention. Use of the layer 74 for retention of the cartridge 52 in the housing 36 eliminates the need for the bolts 63 and their weight. While retention is not dependent on thermal expansion constraint, in some embodiments the layer 74 may simultaneously provide both a retention function and a thermal expansion constraint function.

Figure 13:
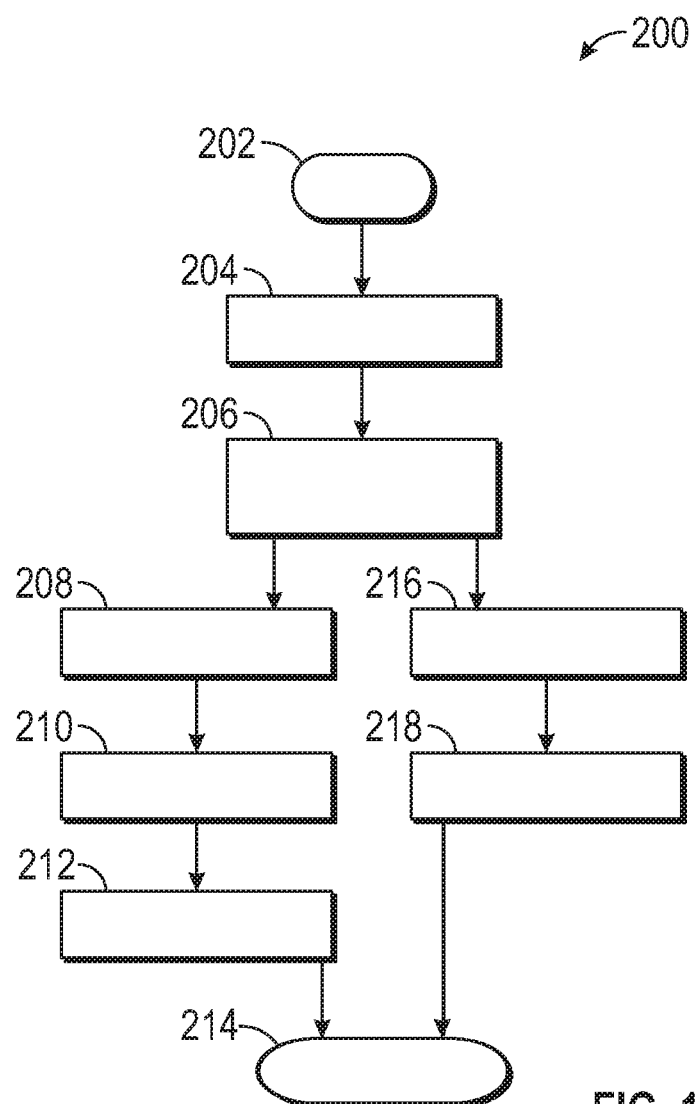
FIG. 13 is a flow chart of methods for controlled thermal expansion, in accordance with various embodiments.

With reference to FIG. 13 a process 200 is illustrated depicting methods for controlling thermal expansion through use of the structures described above. The process 200 begins at step 202 when the production of the product such as the differential 32 begins. The body 60 is formed at step 204. In various embodiments, the body 60 may be formed as a hollow cylindrical shaped structure as shown in FIGS. 2, 4-8 and 10-12. The body 60 may be formed from an aluminum alloy, magnesium alloy, or another appropriate material. In various embodiments, the body 60 may be formed with slots 104 as shown in FIG. 9. In various embodiments, the body 60 may be formed with keys 126 and keyways 128 as shown in FIG. 12. In various embodiments, the body 60 may be formed as a fiber-composite structure as shown in FIG. 11.

The process 200 proceeds to step 206 where the body 60 receives an overlay via the layer 74 of FIG. 2, 6, 7, 8, 9, 10 or 12. In various embodiments, the body 60 receives an overlay of fibrous material with oriented fibers 92. The fibers 92 may be oriented in various directions including in the axial direction 78, in the circumferential direction 96, in another direction, or in multiple directions. The direction or directions of orientation for the fibers 92 are selected based on the direction that thermal expansion constraint is desired. The fibrous material may be applied to the body either dry, after being wetted or infused with a polymer resin, in a pre-impregnated form, or may be applied in another form. The resin may be applied as an uncured thermosetting resin, as a thermoplastic above its melting temperature, or in another form. The fibrous material and resin may be applied around the circumference 94 of the body 60 to form the layer 74. The fibrous material and resin may be applied completely along the length of the body 60 or in bands at select locations along the length of the body 60. From step 206 two options for proceeding are illustrated. The process 200 may proceed to step 208 or to step 216 depending on the retention method selected. In the case of proceeding to step 208, the resin is then cured at room temperature or under the application of heat, such as when a pre-impregnated form is used. At step 210 the cartridge 52 with layer 74 is inserted into the housing 36. At step 212, the cartridge 52 is secured to the housing 36 such as with the bolts 63. Assembly is completed, such as with insertion of the bearings 54, 56 and completion of the differential 32, and the process 200 ends at step 214. In the case of the assembly of FIG. 12, the cartridge 52 is inserted at step 216 into the housing 36 prior to curing. Curing at step 218 secures the cartridge 52 in position within the housing 36. The cartridge 52 with layer 74 is inserted into the housing 36, such as into opening 58 with the layer 74 on the outer perimeter 72 and against the housing 36 at a surface 75 inside the opening 58. In this example, the surface 75 is the inner surface of the housing 36, including within and on the keyways 126 and the keys 128 respectively, of the housing 36. The outer perimeter 72 and the surface 75 mate at an interface 79 where securement by the layer 74 is effected within and around the keyways 126 and the keys 128. The keyways 126 and keys 128 enable sliding the cartridge 52 into the housing 36. In a number of embodiments, the cartridge 52 is slid into the housing 36, the band 124 is wrapped around the cartridge 52 at the keyways 126 and keys 128, the resin is added, and the layer 74 is cured in place. In some embodiments, the band 120 may be cured before the cartridge 52 is assembled into the housing 52. The band 120 and the band 124 may be constructed of the same material, or different materials. Assembly is completed, such as with insertion of the bearings 54, 56 and completion of the differential 32. The process 200 then ends at step 212.

Through the foregoing structures and methods, a component with a body 60 made of one material is constrained by a layer 74 of fiber 92 and polymer composite to exhibit an altered rate of thermal expansion that is tailorable, including to match the rate of thermal expansion of an adjoining component. The rate of thermal expansion may be constrained in one or multiple directions. Variation in thermal expansion constraint are achieved by the direction at which the fibers 92 are oriented, such as to control growth in radial and/or axial directions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A structure comprising:
a body comprised of a material exhibiting a first coefficient of linear thermal expansion;
a component disposed inside the body and exhibiting a second coefficient of linear thermal expansion that is lower than the first coefficient of linear thermal expansion; and
a layer wrapped around the body the layer configured to constrain thermal expansion of the body and configured to maintain contact between the body and the component, the layer comprising a composite containing fibers that are aligned with one another.

2. The structure of claim 1 wherein the body is cylindrical and has a circumference around the body defining a circumferential direction wherein the fibers are aligned in the circumferential direction.

3. The structure of claim 1 wherein the body is formed of an aluminum alloy and the component is formed of steel and wherein the layer constrains thermal expansion of the body toward the second coefficient of linear thermal expansion.

4. The structure of claim 1 wherein a number of grooves are formed in the body and the layer is formed on the body including in the grooves.

5. The structure of claim 4 wherein the grooves are dovetail shaped and extend from an outer circumference of the body into the body to a bottom, wherein the grooves have a first width at the outer circumference and a second width at the bottom that is greater than the first width.

6. The structure of claim 1 wherein the component comprises a bearing and wherein the layer is formed in a band disposed outside and around the bearing.

7. The structure of claim 1 wherein the body is cylindrical and has a circumference around the body and comprising a series of keys and keyways alternating around the circumference.

8. The structure of claim 1 wherein the body is formed in a hollow cylindrical shape and a shaft extends through the body and is rotationally supported on the body by the component.

9. The structure of claim 8 wherein the component comprises a pair of bearings spaced apart along the body.

10. The structure of claim 1 wherein the fibers comprise a material that exhibits a stiffness greater than 70 gigapascal and a coefficient of linear thermal expansion less than 10 ppm/K.

11. The structure of claim 1 wherein the fibers comprise carbon and the composite comprises a polymer in which the fibers are disposed.

12. The structure of claim 1 wherein the layer is configured to constrain the thermal expansion of the body to match a second thermal expansion of the component.

13. A structure comprising:
a body comprised of a material exhibiting a first coefficient of linear thermal expansion;
a component disposed inside the body and exhibiting a second coefficient of linear thermal expansion that is lower than the first coefficient of linear thermal expansion; and
a layer wrapped around the body and constraining thermal expansion of the body, the layer comprising a composite containing fibers that are aligned with one another, wherein the fibers comprise a first set of fibers oriented in alignment with one another at a first angle relative to the body and a second set of fibers oriented in alignment with one another at a second angle relative to the body, wherein the first and the second angles are variable relative to one another.

14. A method of controlling coefficient of linear thermal expansion comprising:
forming a body of a material exhibiting a first coefficient of linear thermal expansion;
surrounding the body with a layer of a fibrous material wherein the fibrous material comprises fibers oriented in alignment with one another;
including a polymer in the layer with the fibers disposed in the polymer as a composite;
positioning a component inside the body, wherein the component is comprised of a material exhibiting a second coefficient of linear thermal expansion that is lower than the first coefficient of linear thermal expansion; and
constraining thermal expansion of the body with the layer; and
maintaining, by the layer and during temperature increases of the body, contact between the body and the component.

15. The method of claim 14 comprising:
forming the body in a cylindrical shape with a circumference around the body defining a circumferential direction; and
aligned the fibers in the circumferential direction.

16. The method of claim 14 comprising:
forming the body of an aluminum alloy; and
forming the component of steel, wherein the layer constrains thermal expansion of the body to reduce the coefficient of linear thermal expansion of the body.

17. The method of claim 14 comprising:
forming a number of grooves in the body disposed in at least one of a radial direction, an axial direction or at an angle; and
forming the layer on the body including in the grooves.

18. The method of claim 14 wherein the component comprises a bearing and comprising forming the layer in a band shape disposed radially outside and around the bearing, wherein the band shape extends around the body and has a dimension in an axial direction of the body that is less than a length of the body in the axial direction.

19. The method of claim 14 comprising forming a series of keys and keyways alternating around the circumference.

20. The method of claim 14 wherein the first coefficient of linear thermal expansion is approximately two times the magnitude of the second coefficient of linear thermal expansion, and wherein constraining thermal expansion of the body with the layer further comprises constraining, by the layer, the thermal expansion of the body to match the thermal expansion of the body to a second thermal expansion of the component.

* * * * *